United States Patent
He et al.

(10) Patent No.: US 11,808,225 B1
(45) Date of Patent: Nov. 7, 2023

(54) ENGINE LOAD CONTROL DURING A TRANSIENT EVENT

(71) Applicant: Caterpillar Inc., Peoria, IL (US)

(72) Inventors: Yuesheng He, Sugar Land, TX (US); Todd Ryan Kabrich, Tomball, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/929,142

(22) Filed: Sep. 1, 2022

(51) Int. Cl.
| | |
|---|---|
| *F02D 41/02* | (2006.01) |
| *F02D 29/06* | (2006.01) |
| *F02D 29/04* | (2006.01) |
| *B60W 30/09* | (2012.01) |
| *B60W 10/30* | (2006.01) |
| *F02D 41/00* | (2006.01) |
| *F01P 5/02* | (2006.01) |
| *F01M 1/02* | (2006.01) |
| *B60W 30/19* | (2012.01) |

(52) U.S. Cl.
CPC .......... *F02D 41/023* (2013.01); *B60W 10/30* (2013.01); *B60W 30/19* (2013.01); *F01M 1/02* (2013.01); *F01P 5/02* (2013.01); *F02D 29/04* (2013.01); *F02D 29/06* (2013.01); *F02D 41/0027* (2013.01)

(58) Field of Classification Search
CPC ...... F02D 2250/24; F02D 29/04; F02D 29/06; F02D 41/0027; F02D 41/023; B60W 10/30; B60W 2710/30; B60W 2710/305; B60W 30/19; F01M 1/02; F01P 5/02
See application file for complete search history.

(56) References Cited

U.S. PATENT DOCUMENTS

| | | | | |
|---|---|---|---|---|
| 5,031,479 A | * | 7/1991 | Ibamoto | F16H 61/0403 477/110 |
| 5,583,766 A | * | 12/1996 | Birchenough | F16H 61/08 477/109 |
| 5,655,407 A | * | 8/1997 | Dresden, III | B60W 10/11 477/92 |
| 5,679,093 A | * | 10/1997 | Desautels | B60W 10/11 477/109 |
| 5,769,052 A | | 6/1998 | Destreicher et al. | |
| 5,842,376 A | * | 12/1998 | Dresden, III | B60W 10/06 477/92 |

(Continued)

FOREIGN PATENT DOCUMENTS

| | | | | |
|---|---|---|---|---|
| JP | 2001193515 A | * | 7/2001 | |
| JP | 2007022339 A | * | 2/2007 | |

(Continued)

*Primary Examiner* — John M Zaleskas
(74) *Attorney, Agent, or Firm* — Harrity & Harrity, LLP

(57) ABSTRACT

In some implementations, a controller may determine, in connection with a constant speed operation of an engine operable by spark ignition of a gaseous fuel, that a transient event associated with the engine is to occur, the transient event to cause a shift from a first gear to a second gear of a transmission coupled to the engine, where the shift from the first gear to the second gear is to increase a primary load associated with the engine. The controller may cause, prior to the shift from the first gear to the second gear, increasing of an auxiliary load associated with the engine. The controller may cause, during the shift from the first gear to the second gear, decreasing of the auxiliary load.

20 Claims, 3 Drawing Sheets

(56) References Cited

U.S. PATENT DOCUMENTS

| | | | |
|---|---|---|---|
| 5,910,069 A * | 6/1999 | Markyvech | B60W 10/06 477/109 |
| 6,017,291 A * | 1/2000 | Ailes | F16H 61/0403 74/339 |
| 6,223,592 B1 * | 5/2001 | Genise | B60W 10/11 73/115.02 |
| 6,322,476 B1 * | 11/2001 | Kahlon | B60K 6/54 477/3 |
| 6,725,134 B2 | 4/2004 | Dillen et al. | |
| RE38,615 E * | 10/2004 | Dresden, III | B60W 10/11 477/92 |
| 8,798,856 B2 | 8/2014 | Major et al. | |
| 9,638,115 B2 | 5/2017 | Nishimoto et al. | |
| 10,151,251 B1 * | 12/2018 | Levijoki | F02D 31/003 |
| 11,174,800 B2 | 11/2021 | Wang et al. | |
| 2003/0187553 A1 * | 10/2003 | Dillen | F02D 29/02 701/19 |
| 2007/0099757 A1 * | 5/2007 | Landes | F16H 61/21 477/175 |
| 2007/0101818 A1 * | 5/2007 | Kabrich | F16H 61/061 74/335 |
| 2007/0191183 A1 * | 8/2007 | Petridis | B60W 10/06 477/109 |
| 2009/0164084 A1 * | 6/2009 | Hawkins | F01P 7/08 123/41.11 |
| 2010/0121543 A1 * | 5/2010 | Landes | F16H 61/0213 701/55 |
| 2011/0251756 A1 * | 10/2011 | Major | F02D 41/0087 701/102 |
| 2011/0313602 A1 * | 12/2011 | Hirata | B60K 6/48 180/65.265 |
| 2013/0047955 A1 * | 2/2013 | Reedy | B60W 10/06 123/320 |
| 2015/0053175 A1 * | 2/2015 | Nishimoto | F02D 29/06 123/350 |
| 2015/0233310 A1 * | 8/2015 | Zhang | F02M 21/0245 701/54 |
| 2015/0330321 A1 * | 11/2015 | Lucht | F02D 29/06 701/104 |
| 2016/0102624 A1 * | 4/2016 | Were | F02D 29/02 701/99 |
| 2016/0339920 A1 * | 11/2016 | Banker | F16H 63/50 |
| 2017/0088139 A1 * | 3/2017 | Fowler | B60W 30/1886 |
| 2018/0274463 A1 * | 9/2018 | Perfetto | F02D 41/023 |
| 2019/0248373 A1 * | 8/2019 | Witt | F16H 63/40 |
| 2020/0103025 A1 * | 4/2020 | Omran | F16H 61/0213 |
| 2020/0247391 A1 * | 8/2020 | Miwa | F02D 41/0235 |
| 2020/0252014 A1 * | 8/2020 | Pursifull | F16H 63/40 |
| 2021/0087981 A1 * | 3/2021 | Wang | F02D 41/0027 |

FOREIGN PATENT DOCUMENTS

| | | |
|---|---|---|
| JP | 6065446 B2 | 1/2017 |
| JP | 6465013 B2 | 1/2019 |

* cited by examiner

ENGINE LOAD CONTROL DURING A TRANSIENT EVENT

TECHNICAL FIELD

The present disclosure relates generally to engine load control and, for example, to engine load control during a transient event.

BACKGROUND

Gaseous fuel powered engines are common in many applications. For example, the engine of an engine generator set (genset) can be powered by a gaseous fuel. Gaseous fuels, such as natural gas, may be less expensive than other hydrocarbon fuels, more readily available in remote areas, and may burn relatively cleaner during operation. A typical gaseous fuel internal combustion engine differs from a traditional, liquid fuel internal combustion engine primarily in that a gaseous fuel (e.g., methane, natural gas, ethane, and/or propane) is burned in the engine rather than an atomized mist of liquid fuel from a fuel injector or carburetor. Most gaseous fuel engines operate using spark ignition by a conventional spark plug.

While gaseous fuel engines have a number of benefits, gaseous fuel engines are typically associated with poor transient response characteristics. This is because a gaseous fuel engine may be associated with a relatively long path between cylinders of the engine and a fuel inlet to the engine. Thus, it may take several seconds before a volume of gaseous fuel in the engine can be adjusted to a new level. In one example, a gaseous fuel engine, operating at a constant speed, may be used to power a fluid pump, and a flow rate of the fluid pump may be adjusted through switching gears of a transmission coupled to the engine. Here, for example, switching from a lower gear to a higher gear to increase flow rate may be delayed several seconds, or even tens of seconds, while a volume of gaseous fuel in the engine is increased to a level needed for operation using the higher gear.

The control system of the present disclosure solves one or more of the problems set forth above and/or other problems in the art.

SUMMARY

A control system may include an engine operable by spark ignition of a gaseous fuel, a transmission, connected to the engine, operable in at least a first gear and a second gear, and a controller. The controller may be configured to receive, in connection with a constant speed operation of the engine, a command to perform a shift from the first gear to the second gear, where the shift from the first gear to the second gear is to increase a primary load associated with the engine. The controller may be configured to cause, prior to the shift from the first gear to the second gear, increasing of an auxiliary load associated with the engine. The controller may be configured to cause, during the shift from the first gear to the second gear, decreasing of the auxiliary load.

A method may include determining, in connection with a constant speed operation of an engine operable by spark ignition of a gaseous fuel, that a transient event associated with the engine is to occur, where the transient event to cause a shift from a first gear to a second gear of a transmission coupled to the engine, and where the shift from the first gear to the second gear is to increase a primary load associated with the engine. The method may include causing, prior to the shift from the first gear to the second gear, increasing of an auxiliary load associated with the engine. The method may include causing, during the shift from the first gear to the second gear, decreasing of the auxiliary load.

A controller may include one or more memories and one or more processors. The one or more processors may be configured to receive, in connection with a constant speed operation of an engine operable by spark ignition of a gaseous fuel, a command to perform a shift from a first gear to a second gear of a transmission coupled to the engine, where the shift from the first gear to the second gear is to increase or decrease a primary load associated with the engine. The one or more processors may be configured to cause, based on the command, increasing of an auxiliary load associated with the engine. The one or more processors may be configured to cause, during the shift from the first gear to the second gear, decreasing of the auxiliary load.

DETAILED DESCRIPTION

This disclosure relates to a control system, which is applicable to any machine having a reciprocating engine, such as a gaseous fuel engine, associated with poor transient response. For example, the machine may be a genset that includes an engine and a generator.

Figure 1:
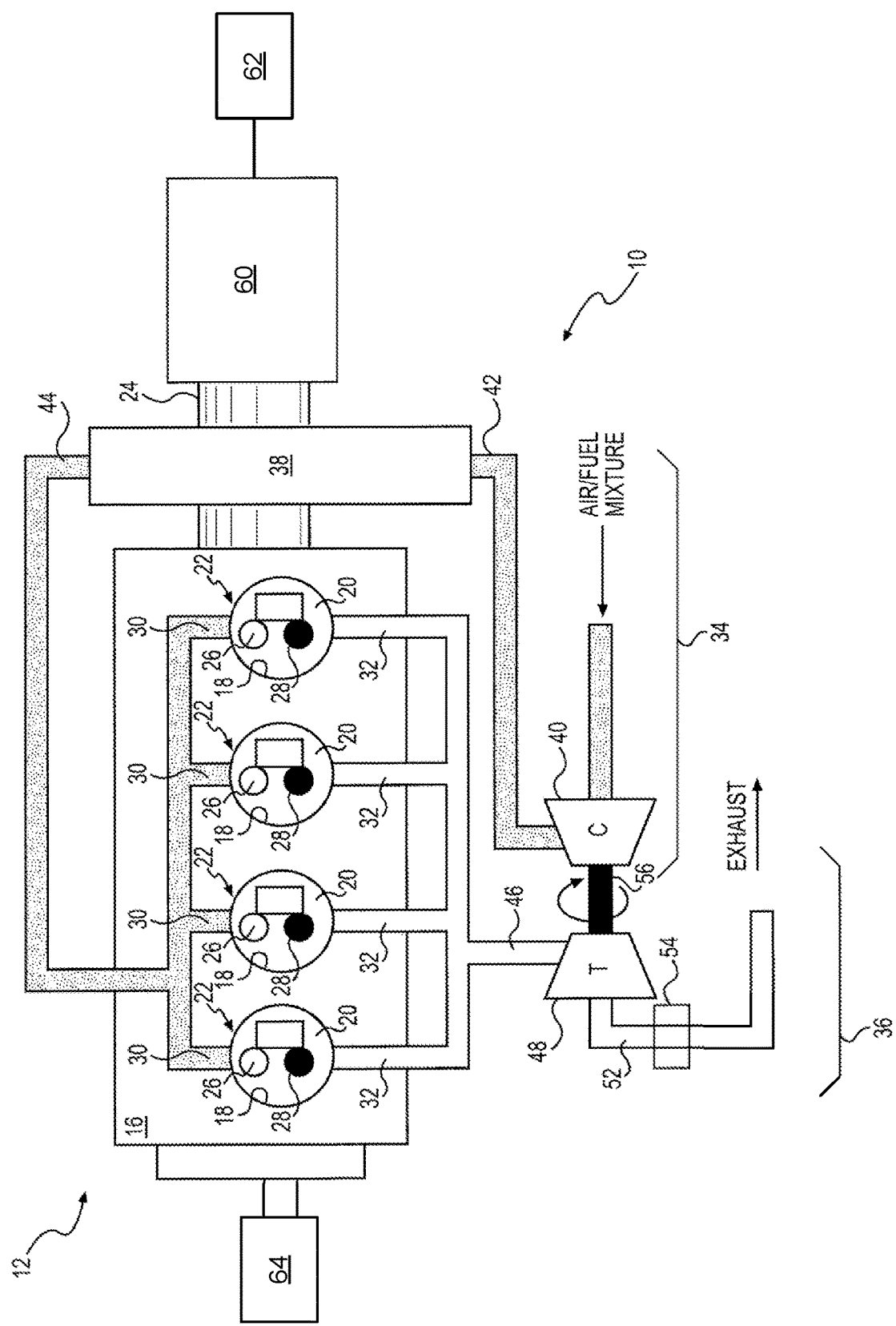
FIG. 1 is a diagram of an example engine system.

FIG. 1 is a diagram of an example engine system 10. Engine system 10 includes an internal combustion engine 12. For example, engine 12 may be a reciprocating engine. In some examples, engine 12 may be operable by spark ignition of a gaseous fuel. That is, engine 12 may be a spark-ignited, gaseous-fueled engine.

Engine 12 includes an engine block 16 that at least partially defines one or more cylinders 18, and a piston 20 disposed within each cylinder 18 to form a main combustion chamber 22. Engine system 10 may include one or more (e.g., multiple) combustion chambers 22, and combustion chambers 22 may be disposed in an "in-line" configuration, a "V" configuration, or in any other conventional configuration. Each piston 20 is configured to reciprocate within a respective cylinder 18. In particular, each piston 20 may be pivotally coupled to a throw of a crankshaft 24 by way of a connecting rod (not shown). Crankshaft 24 of engine 12 is journaled within engine block 16, and each piston 20 is coupled to crankshaft 24, such that a sliding motion of each piston 20 within each cylinder 18 results in a rotation of crankshaft 24. Similarly, a rotation of crankshaft 24 may result in a reciprocating motion of each piston 20.

Engine 12 includes a plurality of gas exchange valves, associated with each cylinder 18, that are configured to meter air and fuel into, and exhaust out of, combustion chambers 22. Specifically, engine 12 includes at least one intake valve 26 and at least one exhaust valve 28 associated with each cylinder 18. Intake valve 26 is configured to allow an air and fuel mixture to flow through a respective intake port 30 and into a corresponding combustion chamber 22 during a portion of intake and/or compression strokes of piston 20. Exhaust valve 28 is configured to allow exhaust to exit from the corresponding combustion chamber 22 through a respective exhaust port 32 during a portion of power and/or exhaust strokes of piston 20.

Engine 12 may include multiple different subsystems that cooperate to facilitate combustion within cylinders 18. The subsystems of engine 12 may include, among other examples, an air induction system 34 and an exhaust system 36. Air induction system 34 is configured to supply a mixture of air and fuel to engine 12 for subsequent combustion. Exhaust system 36 is configured to treat and discharge byproducts of the combustion process from engine 12 to the atmosphere.

Air induction system 34 includes multiple components that cooperate to condition and introduce compressed air and fuel into combustion chambers 22. For example, air induction system 34 may include an air cooler 38 located downstream of one or more compressors 40. Air cooler 38 may be connected to compressors 40 by way of a passage 42 and to intake ports 30 by way of a passage 44. Compressors 40 may be configured to pressurize a mixture of air and gaseous fuel (e.g., natural gas, propane, methane, or a mixture thereof) that is directed through cooler 38 and into engine 12 via passages 42, 44 and intake ports 30. Air induction system 34 may include different or additional components than those described above, such as a throttle valve, filtering components, and/or compressor bypass components, among other examples.

Exhaust system 36 includes multiple components that condition and direct exhaust from combustion chambers 22 to the atmosphere. For example, exhaust system 36 may include an exhaust passage 46, one or more exhaust turbines 48 driven by exhaust flowing through passage 46, and a passage 52. Exhaust passage 46 fluidly connects exhaust ports 32 associated with combustion chambers 22 to exhaust turbine 48. Exhaust turbine 48 is configured to receive exhaust discharged from combustion chambers 22, and is connected to one or more compressors 40 of air induction system 34 by way of a common shaft 56 to form a turbocharger. In some implementations, one or more aftertreatment components 54 (e.g., oxidation catalysts, filters, traps, adsorbers, absorbers, reduction catalysts, scrubbers, and/or exhaust gas recirculation circuits, among other examples) may be disposed within or connected to passage 52. Exhaust system 36 may include different or additional components than those described above, such as bypass components, an exhaust compression or restriction brake, and/or an attenuation device, among other examples.

Engine system 10 includes a transmission 60 connected to engine 12. In particular, transmission 60 may be coupled to crankshaft 24. Transmission 60 may be a multi-gear transmission operable in at least a first gear and a second gear. "First" and "second" are used to indicate that the gears are different from each other, and may, but do not necessarily, refer to gears of transmission 60 commonly referred to as "first gear" and "second gear." For example, the first gear may be the "third gear" of transmission 60 and the second gear may be the "fourth gear" of transmission 60. Using multiple gears, an output of transmission 60 may be switched between multiple speeds even when engine 12 is operating at a constant speed. Transmission types of transmission 60 may include, for example, planetary, countershaft, hydrostatic, or continuously variable transmissions. A primary load 62 associated with engine 12 (e.g., driven by engine 12) may be operably connected to transmission 60. In particular, an input shaft of primary load 62 may be operably connected to an output shaft of transmission 60. Primary load 62 may include any type of power-consuming system or device that receives a mechanical power output from engine 12 (e.g., via transmission 60). For example, primary load 62 may include one or more fluid pumps (e.g., used for hydraulic fracturing), one or more generators, or another device powered by engine 12.

Engine system 10 further includes an auxiliary load 64 associated with engine 12 (e.g., driven by engine 12). As shown, auxiliary load 64 is operably coupled to an opposite end of crankshaft 24 from transmission 60 and primary load 62. However, other configurations may be employed. For example, auxiliary load 64 may be operably coupled to a same end of crankshaft 24 as transmission 60 and primary load 62. Here, auxiliary load 64 may be coupled to crankshaft 24 upstream of transmission 60 or downstream of transmission 60. In some implementations, an input shaft of auxiliary load 64 may be operably coupled to an output shaft of a transmission or a gearbox (not shown) that is coupled to crankshaft 24. Auxiliary load 64 may include any type of power-consuming system or device that receives a mechanical power output from engine 12 (e.g., via a transmission or a gearbox). For example, auxiliary load 64 may include one or more fans of a cooling system associated with (e.g., driven by) engine 12, one or more alternators associated with (e.g., driven by) engine 12, and/or or one or more lubrication pumps associated with (e.g., driven by) engine 12, among other examples.

As described herein, engine 12, transmission 60, primary load 62, and auxiliary load 64 may be associated with a mechanical drive powertrain of engine system 10. That is, engine 12, transmission 60, primary load 62, and auxiliary load 64 may be mechanically coupled so that transmission 60, primary load 62, and auxiliary load 64 may be mechanically driven by engine 12 (e.g., in contrast to being electrically powered). Additionally, or alternatively, engine 12, transmission 60, primary load 62, and/or auxiliary load 64 may have hydraulic fluid connections and/or electrical connections (e.g., to generators and/or alternators, among other examples). In some examples, mechanical coupling of engine 12, transmission 60, primary load 62, and/or auxiliary load 64 may be used in connection with hydraulic fluid connections and/or electrical connections.

As indicated above, FIG. 1 is provided as an example. Other examples may differ from what is described with regard to FIG. 1.

Figure 2:
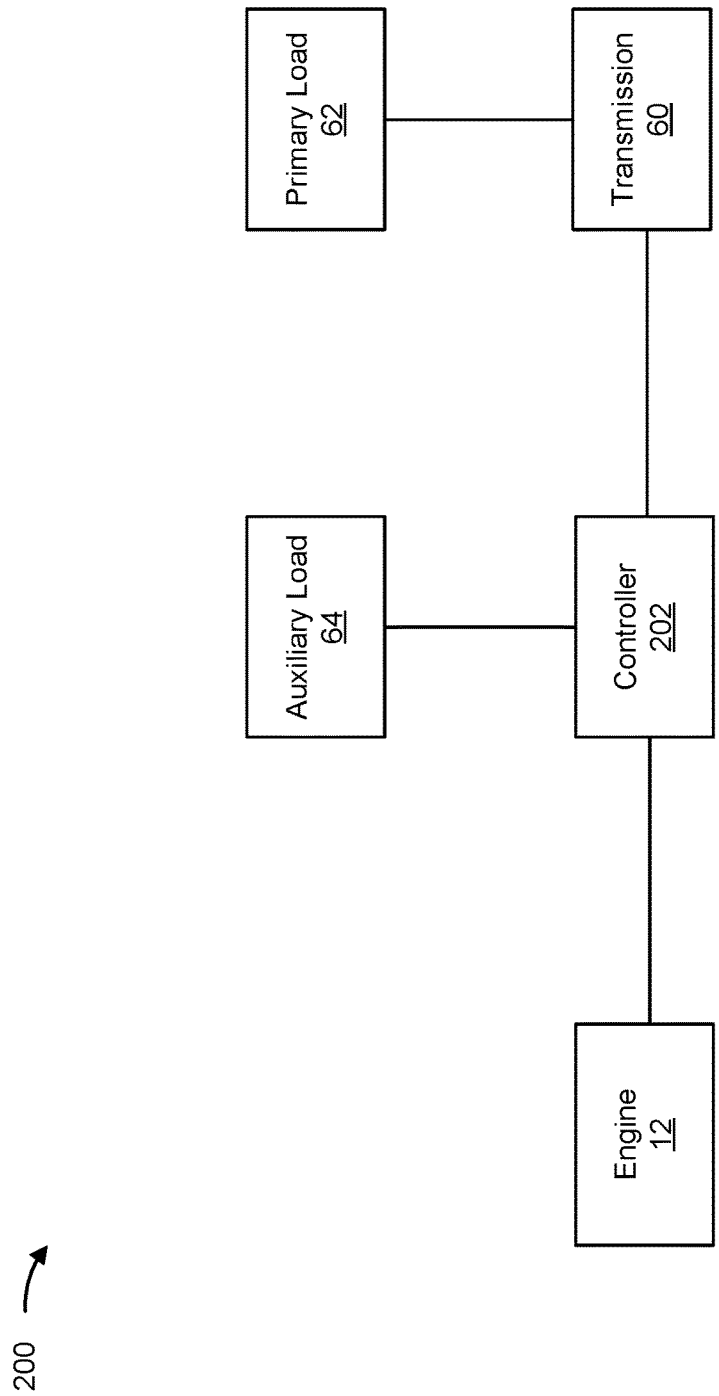
FIG. 2 is a diagram of an example control system.

FIG. 2 is a diagram of an example control system 200. Control system 200 may include one or more components of the engine system 10, as described herein. For example, control system 200 may include engine 12, transmission 60, primary load 62, and/or auxiliary load 64. In addition, control system 200 may include a controller 202. Controller 202 may include one or more memories and one or more processors communicatively coupled to the one or more memories. The one or more processors may perform operations described herein based on information stored in the one or more memories. For example, the one or more processors may be configured to perform operations associated with engine load control during a transient event, as described herein.

Operations described herein may be performed in connection with a constant speed operation (which can also be referred to as a constant speed application) of engine 12. For example, engine 12 may operate at a constant speed when driving a fluid pump as primary load 62. "Constant speed" may refer to an output speed of engine 12 that remains approximately constant (e.g., remains within a threshold range, such as ±1% or ±5%, of a target speed) when engine 12 is operating. In other words, at a constant speed, engine 12 may provide a non-variable output speed (e.g., may rotate crankshaft 24 at a speed that is not variable). Engine 12 may operate at a constant speed in a steady state operation of engine 12, and transient events may temporarily disrupt operation of engine 12 at the constant speed.

In connection with the constant speed operation of engine 12, controller 202 may determine that a transient event, associated with engine 12, is to occur. For example, the transient event may be a shift from the first gear to the second gear of transmission 60, or an event that is to cause the shift from the first gear to the second gear. In some implementations, controller 202 may determine that the transient event (e.g., the shift) is to occur based on information from one or more sensors of engine system 10 (e.g., one or more speed sensors, one or more torque sensors, one or more load sensors, and/or one or more temperature sensors, among other examples). In particular, the information may indicate a deviation from a baseline that is indicative of a transient event occurring and/or a particular state of operation of engine 12 indicative of a transient event occurring.

In some implementations, controller 202 may receive a command to perform the shift from the first gear to the second gear of transmission 60. Here, controller 202 may determine that a transient event is to occur based on receiving the command. Controller 202 may receive the command from an operator control of a machine that includes engine 12. That is, the command to perform the shift may be provided by an operator of a machine that includes engine 12. The shift from the first gear to the second gear may be from a lower gear to a higher gear (i.e., an upshift) or from a higher gear to a lower gear (i.e., a downshift). The shift from the first gear to the second gear may increase the primary load 62 (e.g., in the case of an upshift) or decrease the primary load 62 (e.g., in the case of a downshift).

In some implementations, based on determining that the transient event is to occur (e.g., based on receiving the command to shift gears), controller 202, prior to performing (e.g., causing performance of) the shift (e.g., one or more seconds prior), may cause increasing of auxiliary load 64. For example, if the shift is an upshift, controller 202 may cause increasing of auxiliary load 64 prior to the upshift. Controller 202 may cause increasing of auxiliary load 64 via a transmission, a gearbox, or the like, coupled to auxiliary load 64. The auxiliary load 64 may be increased instantaneously, or gradually over a time period. To increase auxiliary load 64, controller 202 may cause auxiliary load 64 to operate at a maximum level or at a higher level than a current level. Increasing auxiliary load 64 may cause an increase to a volume of gaseous fuel flowing into engine 12, thereby increasing an available horsepower of engine 12 and enabling the shift from the first gear to the second gear to be performed quickly. Controller 202 may cause increasing of auxiliary load 64 independently of (e.g., unrelated to) a primary function of auxiliary load 64 (e.g., the increase is solely for the purpose of increasing the volume of gaseous fuel). For example, if auxiliary load 64 includes one or more fans for cooling engine 12, controller 202 may cause increasing of auxiliary load 64 without regard to a temperature of engine 12.

During the shift (e.g., the upshift) from the first gear to the second gear (e.g., while the shift is being performed), controller 202 may cause decreasing of auxiliary load 64. Controller 202 may cause decreasing of auxiliary load 64 via a transmission, a gearbox, or the like, coupled to auxiliary load 64. The auxiliary load 64 may be decreased instantaneously, or gradually over a time period. To decrease auxiliary load 64, controller 202 may cause auxiliary load 64 to operate at a minimum level, at a previous level used prior to increasing auxiliary load 64, or at a lower level than a current level (e.g., lower than the increased level). Accordingly, the increase of primary load 62 attributable to the shift may occur concurrently with the decrease of auxiliary load 64, thereby effectuating a power swap between primary load 62 and auxiliary load 64 and minimizing a speed droop (e.g., a speed below the constant speed setting) of engine 12. Moreover, because of the increase to the volume of gaseous fuel flowing into engine 12 attributable to increasing auxiliary load 64 prior to the shift, the increase of primary load 62 may be achieved without significant delay. In other words, a delay associated with increasing the volume of gaseous fuel flowing into engine 12, which is needed to effectuate the shift and increase primary load 62, is reduced by increasing auxiliary load 64 prior to the shift.

In some implementations, based on determining that the transient event is to occur (e.g., based on receiving the command to shift gears), controller 202 may cause increasing of auxiliary load 64 at an outset of performing (e.g., causing performance of) the shift from the first gear to the second gear (or otherwise during the shift from the first gear to the second gear). For example, if the shift is a downshift, controller 202 may cause increasing of auxiliary load 64 at an outset of the shift from the first gear to the second gear. The auxiliary load 64 may be increased in a similar manner as described above. Increasing auxiliary load 64 at an outset of the downshift may cause an excess volume of gaseous fuel in engine 12, attributable to decreasing primary load 62, to be absorbed, thereby absorbing excess horsepower of engine 12 and minimizing an overspeed condition (e.g., a speed above the constant speed setting) of engine 12. Controller 202 may cause increasing of auxiliary load 64 independently of (e.g., unrelated to) a primary function of auxiliary load 64, as described above (e.g., the increase is solely for the purpose of absorbing excess gaseous fuel).

During the shift (e.g., the downshift) from the first gear to the second gear (e.g., while the shift is being performed), controller 202 may cause decreasing of auxiliary load 64, in a similar manner as described above. For example, controller 202 may cause decreasing of auxiliary load 64 concurrently with a volume of gaseous fuel in engine 12 reducing to a level appropriate for a current engine load in connection with the downshift.

As indicated above, FIG. 2 is provided as an example. Other examples may differ from what is described with regard to FIG. 2.

Figure 3:
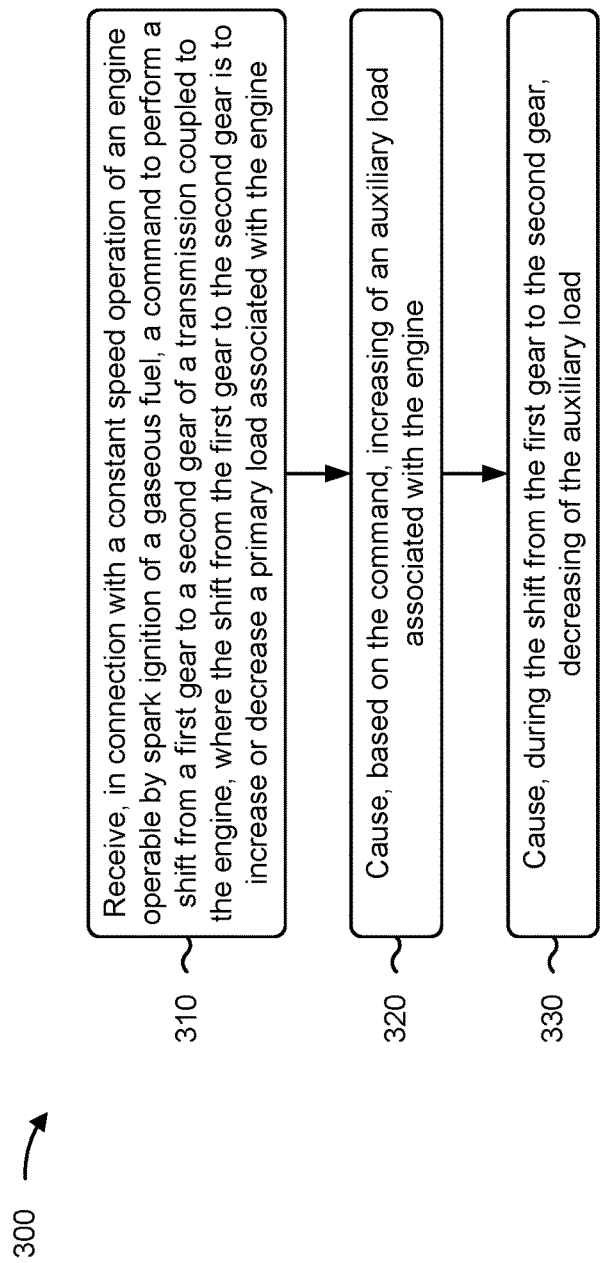
FIG. 3 is a flowchart of an example process associated with engine load control during a transient event.

FIG. 3 is a flowchart of an example process 300 associated with engine load control during a transient event. One or more process blocks of FIG. 3 may be performed by a controller (e.g., controller 202). Additionally, or alternatively, one or more process blocks of FIG. 3 may be performed by another device or a group of devices separate from or including the controller, such as another device or component that is internal or external to a machine that includes engine 12.

As shown in FIG. 3, process 300 may include receiving, in connection with a constant speed operation of an engine operable by spark ignition of a gaseous fuel, a command to perform a shift from a first gear to a second gear of a transmission coupled to the engine, where the shift from the first gear to the second gear is to increase or decrease a primary load associated with the engine (block 310). For example, the controller may receive, in connection with a constant speed operation of an engine operable by spark ignition of a gaseous fuel, a command to perform a shift from a first gear to a second gear of a transmission coupled to the engine, as described above. The shift from the first gear to the second gear may be to increase or decrease a primary load associated with the engine. The engine, the transmission, the primary load, and the auxiliary load may be mechanically coupled.

The primary load may include one or more fluid pumps. For example, the shift from the first gear to the second gear may be to increase a flow rate of the one or more fluid pumps. The auxiliary load may include one or more fans of a cooling system associated with the engine. Additionally, or alternatively, the auxiliary load may include at least one of an alternator or a lubrication pump.

As further shown in FIG. 3, process 300 may include causing, based on the command, increasing of an auxiliary load associated with the engine (block 320). For example, the controller may cause, based on the command, increasing of an auxiliary load associated with the engine, as described above. The shift from the first gear to the second gear may be an upshift that is to increase the primary load, and increasing of the auxiliary load may be prior to the shift from the first gear to the second gear. Alternatively, the shift from the first gear to the second gear may be a downshift that is to decrease the primary load, and increasing of the auxiliary load may be at an outset of the shift from the first gear to the second gear. Increasing of the auxiliary load may be independently of a primary function of the auxiliary load. Increasing of the auxiliary load may be to cause an increase to a volume of the gaseous fuel flowing into the engine.

As further shown in FIG. 3, process 300 may include causing, during the shift from the first gear to the second gear, decreasing of the auxiliary load (block 330). For example, the controller may cause, during the shift from the first gear to the second gear, decreasing of the auxiliary load, as described above.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The control system described herein may be used with a reciprocating engine, such as a spark-ignited, gaseous fuel engine, and the engine may be coupled to a transmission and a primary load. For example, the control system may be used for an application in which the engine is operating at a constant speed, such as driving a fluid pump, and the transmission provides speed control. The control system is useful for preventing or minimizing a speed droop condition and/or an overspeed condition when the transmission shifts gears (e.g., to change a flow rate of the fluid pump). For example, as described herein, the control system may cause increasing of an auxiliary load prior to an upshift, that is to increase the primary load, to thereby prevent or minimize a speed droop condition. As another example, as described herein, the control system may cause increasing of the auxiliary load at an outset of a downshift, that is to decrease the primary load, to thereby prevent or minimize an overspeed condition.

In this way, engine speed recovery to a steady state is improved by the control system. In other words, the control system improves a transient response time of the engine. Accordingly, the engine may provide a more stable output, thereby improving a performance of the primary load.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A control system, comprising:
an engine operable by spark ignition of a gaseous fuel;
a transmission, connected to the engine, operable in at least a first gear and a second gear; and
a controller configured to:
receive, in connection with a constant speed operation of the engine, a command to perform a shift from the first gear to the second gear,
wherein the shift from the first gear to the second gear is to increase a primary load associated with the engine;
cause, prior to the shift from the first gear to the second gear, increasing of an auxiliary load associated with the engine; and
cause, during the shift from the first gear to the second gear, decreasing of the auxiliary load.

2. The control system of claim 1, wherein the controller, to cause increasing of the auxiliary load, is configured to cause increasing of the auxiliary load independently of a primary function of the auxiliary load.

3. The control system of claim 1, wherein the primary load comprises one or more fluid pumps.

4. The control system of claim 3, wherein the shift from the first gear to the second gear is to increase a flow rate of the one or more fluid pumps.

5. The control system of claim 1, wherein the auxiliary load comprises one or more fans of a cooling system associated with the engine.

6. The control system of claim 1, wherein the auxiliary load comprises at least one of an alternator or a lubrication pump.

7. The control system of claim 1, wherein the controller is further configured to:
cause, at an outset of a shift from the second gear to the first gear, increasing of the auxiliary load,
wherein the shift from the second gear to the first gear is to decrease the primary load.

8. The control system of claim 1, wherein the engine, the transmission, the primary load, and the auxiliary load are mechanically coupled.

9. A method, comprising:
determining, by a controller in connection with a constant speed operation of an engine operable by spark ignition of a gaseous fuel, that a transient event associated with the engine is to occur,
wherein the transient event is to cause a shift from a first gear to a second gear of a transmission coupled to the engine, and
wherein the shift from the first gear to the second gear is to increase a primary load associated with the engine;
causing, by the controller prior to the shift from the first gear to the second gear, increasing of an auxiliary load associated with the engine; and
causing, during the shift from the first gear to the second gear, decreasing of the auxiliary load.

10. The method of claim 9, further comprising:
receiving a command to perform the shift from the first gear to the second gear, wherein determining that the transient event is to occur is based on the command.

11. The method of claim 9, wherein causing increasing of the auxiliary load comprises causing increasing of the auxiliary load independently of a primary function of the auxiliary load.

12. The method of claim 9, wherein causing increasing of the auxiliary load is to cause an increase to a volume of the gaseous fuel flowing into the engine.

13. The method of claim 9, wherein the primary load comprises one or more fluid pumps.

14. The method of claim 9, wherein the auxiliary load comprises one or more fans of a cooling system associated with the engine.

15. A controller, comprising:
one or more memories; and
one or more processors configured to:
receive, in connection with a constant speed operation of an engine operable by spark ignition of a gaseous fuel, a command to perform a shift from a first gear to a second gear of a transmission coupled to the engine,
wherein the shift from the first gear to the second gear is to increase or decrease a primary load associated with the engine;
cause, based on the command, increasing of an auxiliary load associated with the engine; and
cause, during the shift from the first gear to the second gear, decreasing of the auxiliary load.

16. The controller of claim 15, wherein the shift from the first gear to the second gear is an upshift that is to increase the primary load, and
wherein the one or more processors, to cause increasing of the auxiliary load, are configured to cause increasing of the auxiliary load prior to the shift from the first gear to the second gear.

17. The controller of claim 15, wherein the shift from the first gear to the second gear is a downshift that is to decrease the primary load, and
wherein the one or more processors, to cause increasing of the auxiliary load, are configured to cause increasing of the auxiliary load at an outset of the shift from the first gear to the second gear.

18. The controller of claim 15, wherein the one or more processors, to cause increasing of the auxiliary load, are configured to cause increasing of the auxiliary load independently of a primary function of the auxiliary load.

19. The controller of claim 15, wherein the primary load comprises one or more fluid pumps.

20. The controller of claim 15, wherein the auxiliary load comprises one or more fans of a cooling system associated with the engine.

* * * * *